Oct. 6, 1936.  G. TAUSCHEK  2,056,375

MACHINE FOR UTILIZING REGISTRATION CARDS

Filed Nov. 28, 1930  7 Sheets-Sheet 1

G. Tauschek
INVENTOR

By: Marks & Clerk
ATTYS

Oct. 6, 1936.  G. TAUSCHEK  2,056,375
MACHINE FOR UTILIZING REGISTRATION CARDS
Filed Nov. 28, 1930  7 Sheets-Sheet 2

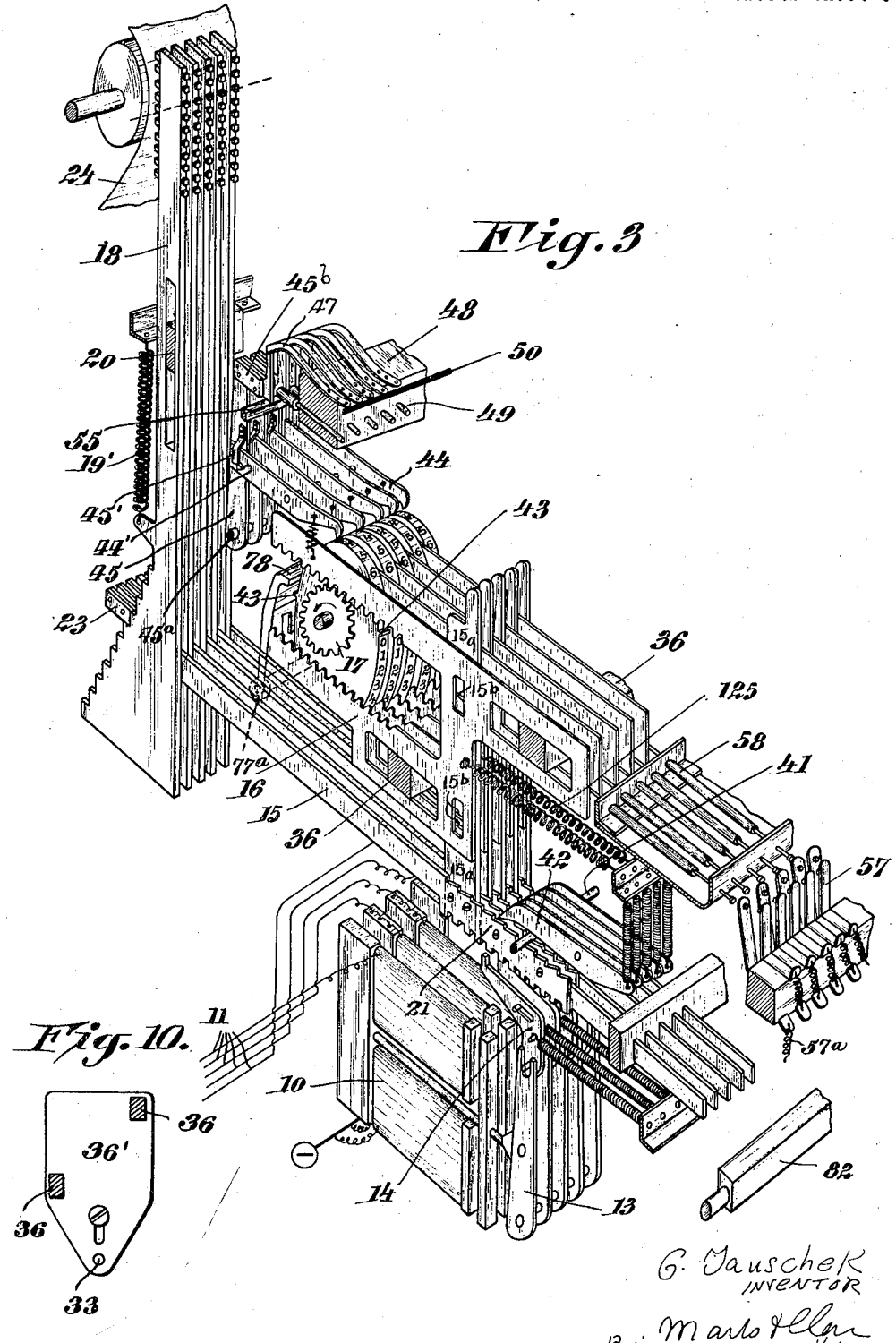

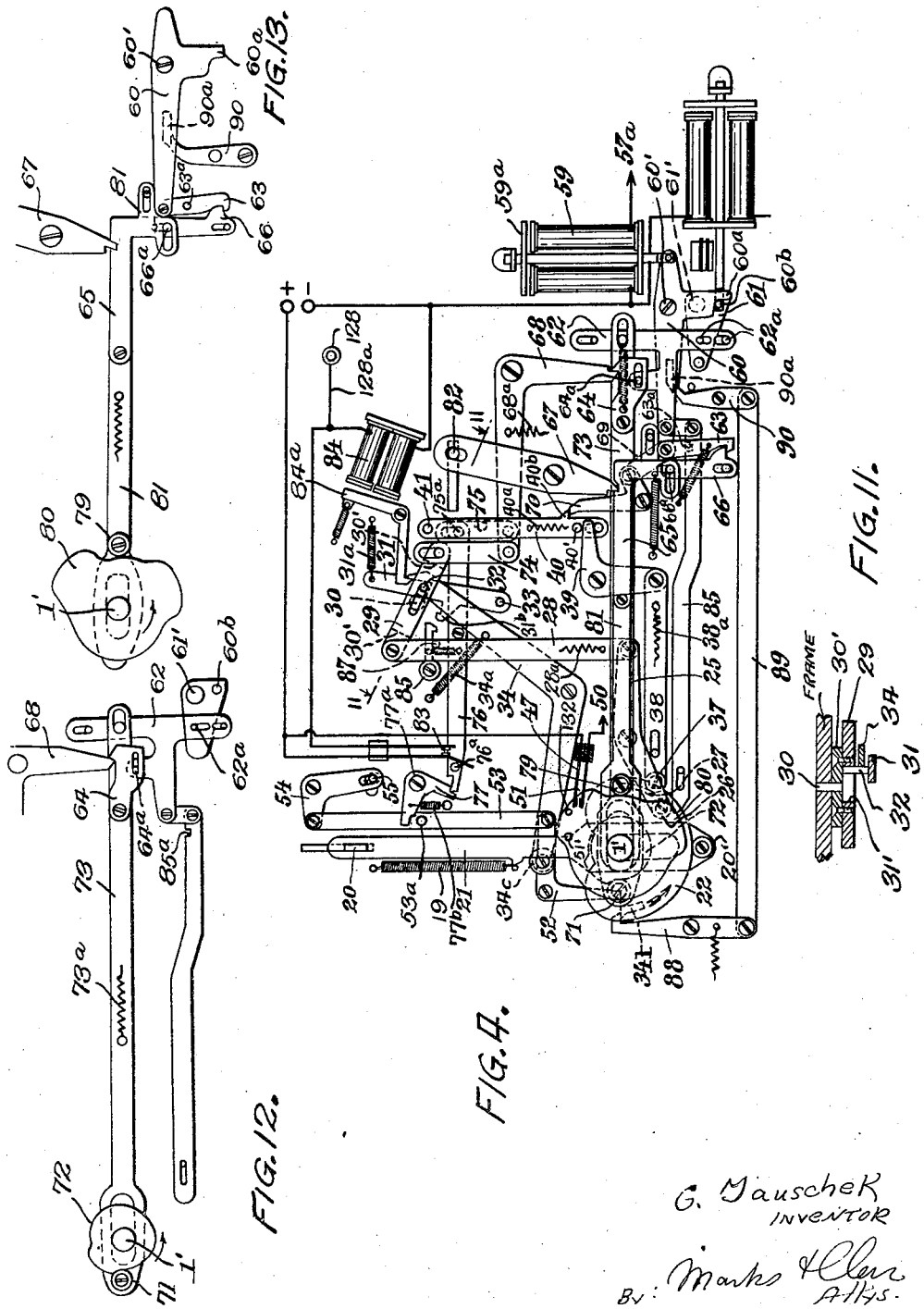

Oct. 6, 1936. G. TAUSCHEK 2,056,375
MACHINE FOR UTILIZING REGISTRATION CARDS
Filed Nov. 28, 1930 7 Sheets-Sheet 5
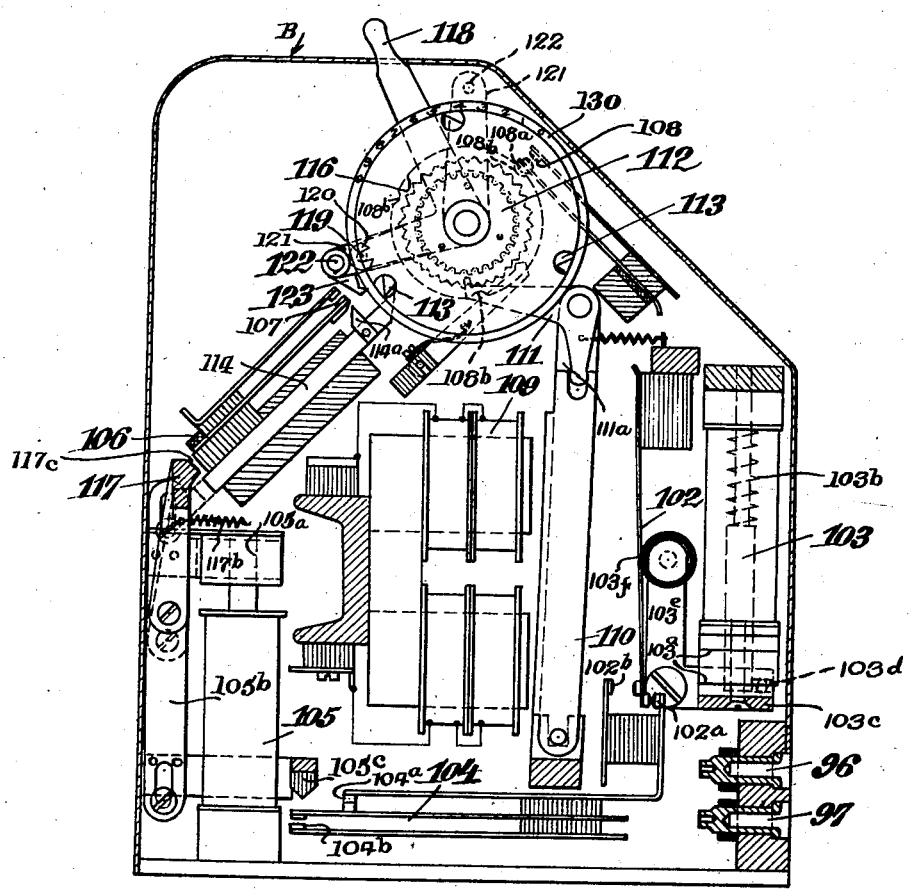

Oct. 6, 1936. G. TAUSCHEK 2,056,375
MACHINE FOR UTILIZING REGISTRATION CARDS
Filed Nov. 28, 1930 7 Sheets-Sheet 6

Oct. 6, 1936. G. TAUSCHEK 2,056,375
MACHINE FOR UTILIZING REGISTRATION CARDS
Filed Nov. 28, 1930 7 Sheets-Sheet 7
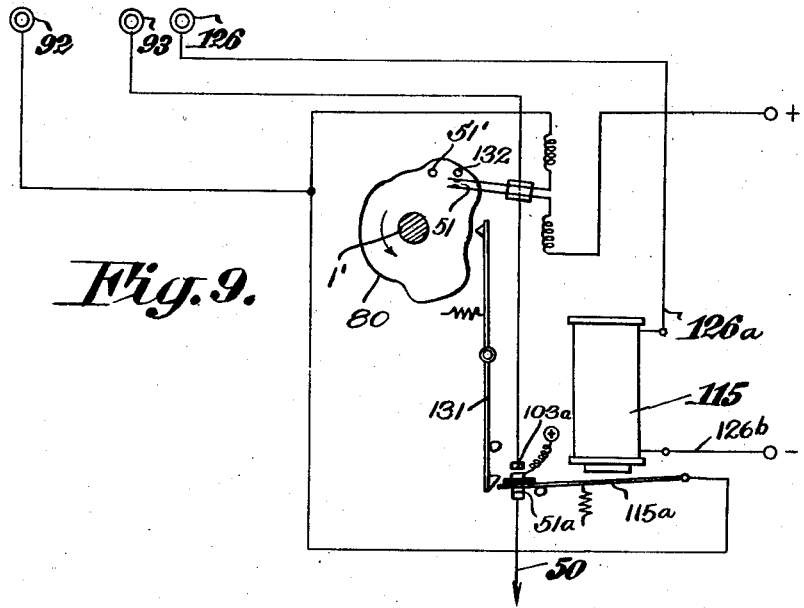
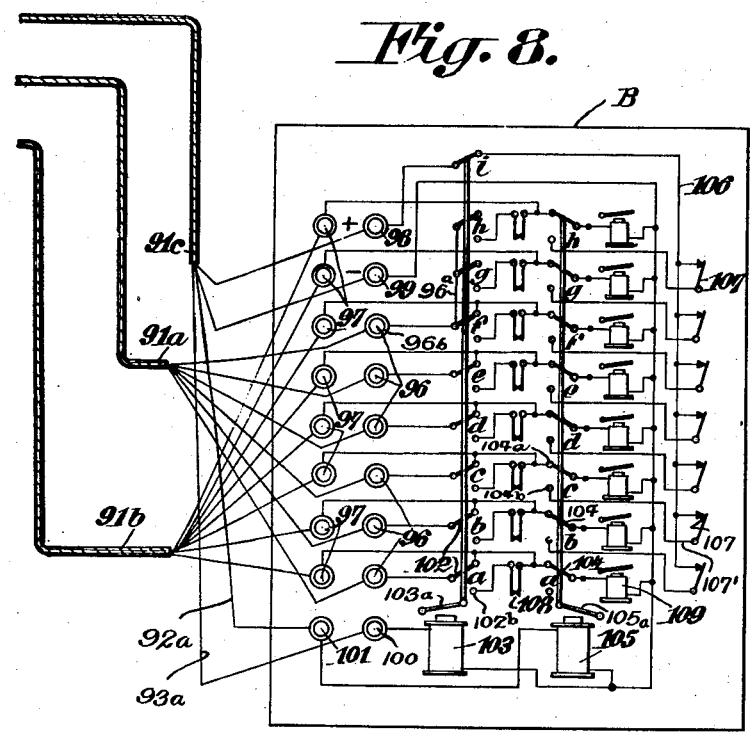
G. Tauschek
INVENTOR
By Marks & Clerk
Attys.

Patented Oct. 6, 1936

2,056,375

UNITED STATES PATENT OFFICE 2,056,375

MACHINE FOR UTILIZING REGISTRATION CARDS

Gustav Tauschek, Vienna, Austria, assignor, by mesne assignments, to International Business Machines Corporation, New York, N. Y., a corporation of New York Application November 28, 1930, Serial No. 498,867
In Austria December 3, 1929

28 Claims. (Cl. 235—92)

This invention relates to statistical machines, particularly tabulating machines and the like, in which entries in counters are controlled by perforated cards. Machines of this kind are usually provided with one or more counters which receive entries represented by perforations in columns of the cards and which may be arranged for operation so that the perforations of one field of a card simultaneously control entries in corresponding elements of two or more counters. Additional provision is also made whereby these counters may be controlled independently of each other in resetting operations so that their results may be individually erased.

When constructing machines of this kind a certain number of counters, with regard to limitations in size of the machine can be provided only and thus a certain number of denominations in the aggregate. In view of the costs of manufacturing the machine, care has to be taken in order to receive a fair return on the investment to provide a number of counters which is sufficient to satisfy the ordinary and general requirements in accordance with the best utilization of the cards used in practice, and furthermore, to take care that the cost of the machine is not unnecessarily increased by the provision of counters which are not always used.

The present invention has for its object to arrange a tabulating machine in such a manner, that one is not limited to a certain number of counters, this object being attained by provision of means whereby besides the counters of the tabulating machine any desired number of removable additional counters can be added, each provided with its own tens-transfer means. The arrangement is such that the same card-analyzing devices control the entries in the counters of the tabulating machine as well as in the removable additional counters.

The arrangement is such that the removable additional counter may be disposed for simultaneous operation with the counter of the tabulating machine, e. g. the same entries are entered in the removable counter as are entered in the tabulating machine counter, or the removable counters may be connected in such a manner with the tabulating machine that they are controlled by other columns of the card than those which control entries in the counter of the tabulating machine.

According to the present invention each additional counter may be further constructed in such a manner, that it permits the transference of the result shown into the counter to the counter of the tabulating machine and to printing mechanism, so that the results in the additional counter can also be reset and automatically printed.

In the constructional example there is shown the connection of one of three additional counters with a tabulating machine, which is operated electrically and under control of cards which are provided with holes arranged according to the Tauschek-system, in which the number of holes in a column of the card is equal to the digital value expressed. Of course, a mechanically operated machine controlled by holed cards may also be employed and the devices of the invention, which in the illustrative embodiment are controlled by electrical circuits, may be controlled by equivalent mechanical means.

Another relatively important construction which considerably increases the value of the invention, is attained by use of an arrangement employed in the illustrative embodiment. Namely, it is possible to bodily separate the tabulating machine and the additional counter and still provide for the operation of the additional counter, by connecting the latter with the tabulating machine by plug cords. For instance, in a place of business in which the cash balance is continuously obtained by means of the tabulating machine, an additional counter connected by plug cords with the tabulating machine may be located in the room apart from the tabulating machine and in which room the person controlling the cash balances resides, so that said person is always acquainted with the exact cash on hand at any time.

One mode of carrying out the present invention is illustrated in the accompanying sheets of drawings in which:—

Fig. 3 is a perspective view of the counter operating and printing mechanism of the tabulating machine.

Fig. 4 is a view in side elevation of a portion of the tabulating machine and shows certain operating and control devices thereof.

Fig. 6 is a cross sectional view of the additional counter.

Fig. 8 is the wiring diagram of the electrical devices in the additional counter and shows the exterior plug connections.

Fig. 9 is the wiring diagram of certain electrical control devices of the tabulating machine.

Fig. 10 is a detail of a device employed for shifting the actuating racks.

Fig. 11 is a sectional view taken on the line 11—11 of Fig. 4.

Figs. 12 and 13 are views in side elevation of some of the parts disclosed in Fig. 4.

Card analyzer

Figure 1:
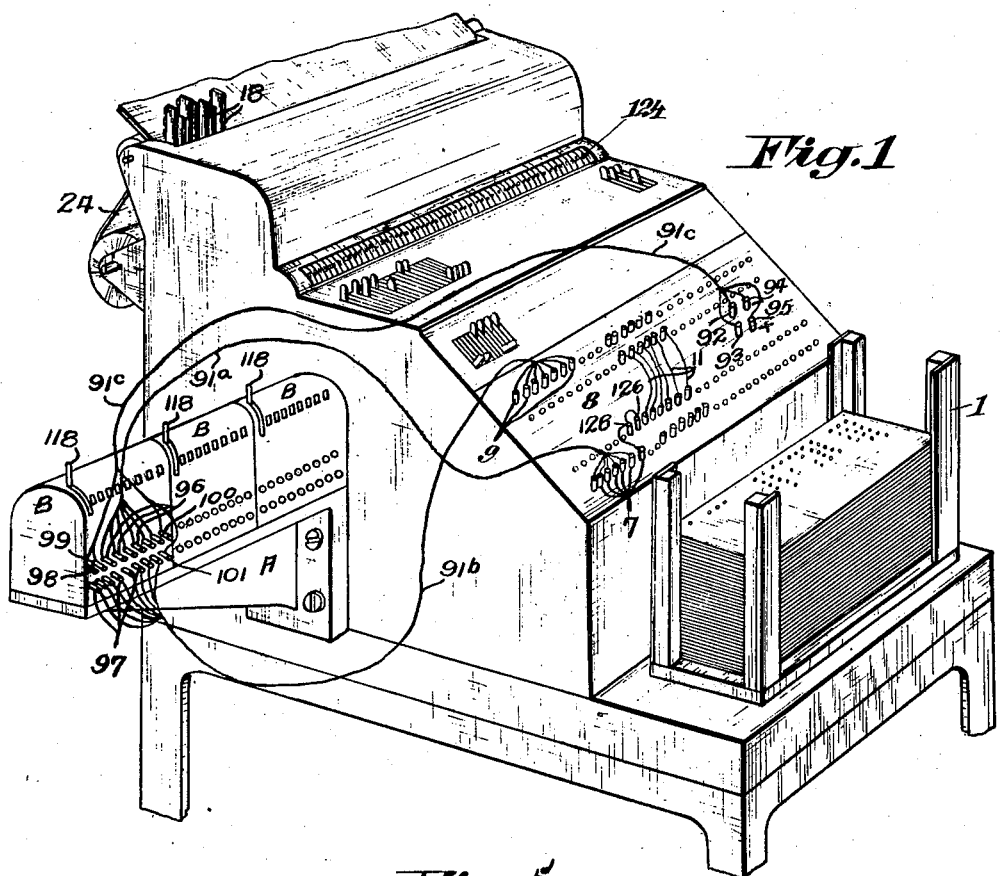
Fig. 1 is a perspective view of a tabulating machine shown provided with three additional counters.

The cards to be tabulated are placed into the card receptacle 1 (Fig. 1) from which they are individually fed in known manner by the usual picker blade to feed-rollers 2, (Fig. 2) which move the cards past the card-reading mechanism 3. The latter includes an electrically conducting base 4, which is connected to the positive side of a source of power, the electrical contact with said base being made by brushes 5 passing through the holes of the card during its rearward movement. The brushes 5 are connected by wires 6 with corresponding sockets 7, arranged in a plugboard 8 of the tabulating machine. The plugboard is further provided with sockets 9, each of which is connected with a related counter-magnet 10 (Fig. 3) by means of a wire 11. The brushes 5 may be connected in a convenient manner for control over the counter-magnets 10 by means of plug cords 12 (Fig. 2). Magnets 10 are connected to the negative side of the source of power. In the illustrated construction sixty brushes 5 are provided to read cards furnished with sixty columns, said sixty brushes being connected with the same number of sockets 7. Seventy-five counter-magnets, and thus denominations, are provided in the fixed counter and, as stated, are connected with the sockets 9.

Counter operating mechanism

In case one of the sockets 7 is connected with the desired socket 9 by a cord 12 an electric circuit is closed by the related brush 5 by way of the sockets 7 and 9 and cord 12 during every passage of a hole of the card past the related brush 5, and the corresponding counter magnet 10 (Fig. 3) is excited, so that the latter attracts its armature a corresponding number of times. Thereby an adjusting member 15 is stepwise fed to the left by means of the related armature lever 13 and the pawl 14, said adjusting member being secured in the adjusted position by a pawl 42, engaging the upper teeth of said member 15, and which pawl 42 is first lowered under control of a rod 41, as will be later explained.

Each adjusting member 15 has secured thereto a vertical extension 15a and said extension has integral lugs 15b receiving slots of a U-shaped rack member 16. By virtue of the lug and slot connection, racks 16 may be shifted up or down independent of members 15, but they partake of the adjustment of such members.

Each card-hole corresponds to a step of the adjusting member 15. When the racks 16 are in the position for addition controlled by means of a pair of rods 36, they are in such position so that the upper teeth of racks 16 mesh with pinions 17 as shown in Fig. 3. For the purpose of securing addition of values, the adjusting members 15 are fed, as stated, stepwise to the left by the pawls 14, whereby the pinions 17 together with their numeral indicating wheels are rotated in a counterclockwise direction.

Printing mechanism

When the adjusting members 15 have been fed to the left extents according to the value of the card perforations whereby the item has been entered in the related numeral wheels, type carriers 18 are elevated to control printing of the item.

The slidably mounted type carriers 18 are normally held downwardly by a rail 20 against the action of springs 19' which tend to elevate them. This rail is carried by a pair of members 21 (Fig. 4) which are urged by springs 19 so that rollers 20' carried thereby engage related cams 22. After the differential positioning of members 15, cam 22 is rotated by the main operating shaft 1' sufficiently to allow members 21 to rise under action of springs 19 so that the bar 20 permits the type carriers 18 to be elevated under control of their springs 19' until blocks 23 (Fig. 3) at the extremities of the members 15 are engaged by the stepped shoulders at one extremity of each of the type carriers 18. Thus the type representing the number corresponding to the card perforations are now disposed opposite the paper strip 24 so that the number is typed thereon, by known arrangements, such as type hammers. Thereafter, at the time the adjusting members 15 are being returned to normal, continued rotation of cams 22 cause bar 20 to be lowered under action of springs 19 to thereby positively return the type carriers to their normal position.

Engagement of racks and counter

It has been previously stated that the pair of rods 36 control the position of racks 16 and means is provided to shift such rods to disengage racks 16 from pinions 17 to permit free restoration of members 16 to normal under action of springs 125 (Fig. 3) after being differentially set without returning said pinions 17 reversely.

This action is under control of a lever 29 (Figs. 4 and 11) which is rotatable about a pivot 30. In actual construction a member demarcated by dotted lines 30' indicating its left and right extremities is secured by screws to lever 29 and this member 30' carries the pivot rod 30, which is fitted in the side machine frame.

The lever 29 is provided with a slot 31' in which fits a pin 32 of a lever 31. The lever 31 is provided at its lower end with a pin 33 slidable in a slot in the machine frame and extending through the frame to be secured to a slidable member 36' (Fig. 10) which carries the rods 36. A spring 31a secured to the upper end of lever 31 normally retains pin 32 at the right end of slot 31'.

As cam disk 22 rotates and at the end of the machine cycle (Fig. 4) a crescent shaped cam member 27 secured to cam disk 22 engages a roller 26 mounted on a bell crank lever 25 so that as bell crank lever 25 is rocked clockwise a horizontal arm thereof depresses a link 28 which is connected to the left end of lever 29 against the action of a spring 28a thereby causing the lever 29 to occupy a horizontal position. As it does so, since pin 32 is at the right of pivot 30, lever 31 is raised, thus elevating member 36' and rods 36. Thus, from Fig. 3 it is apparent that the upper teeth of racks 16 are now free of toothed wheels 17 whereupon racks 16 return to normal under action of return springs 125 (Fig. 3).

At the initial operation of the machine the crescent shaped cam member 27, as cam 22 rotates, leaves a roller 37 (Fig. 4) of a link 38 thereby permitting the link to be shifted to the left under the action of a suitable connected spring 38a. The horizontal arm of bell crank 39 underlies a pin 40' of a slidably mounted member 40, thereby permitting a spring 40a to depress said member. A pair of members 40, however, is provided and they carry the rod 41 and this rod 41 (Fig. 3) as it is lowered permits pawls 42 to be rocked to engage the adjusting members 15 to hold the racks as they are subsequently successively stepped. By a reverse action pawls 42 are disengaged from the adjusting members 15 after lever 29 is turned to a horizontal position.

Transfer mechanism

The tens transfer mechanism adapted to be used with the present machine is fully shown and described in the British Patent #289,055 and therefore, is only shown and described generally herein.

Each numeral wheel carries transfer projections 43 (Fig. 3) one adapted as the wheel passes from "9" to "0" to rock a lever 44 to free its triangular projection 44' from cooperation with a bent plate 45' carried by a transfer pawl 45 pivoted at 45a. By means of a spring blade 47 cooperating with a contact blade 45b carried by the upper end of a related pawl said pawl is shifted by the resiliency of blade 47 so that its blade 45b contacts with a contact point 49. Each contact point 49 has a wire connection to a counter magnet 10 of the next higher order.

After the entry operation and prior to the return of racks 16, a current impulse is transmitted under control of contacts 51 closed by a pin 51' on the cam 22 (Fig. 4) to a wire 50 (see Fig. 3) so that those magnets 10 which have been selected for energization will receive an extra electrical impulse to effect the unit transfer, as the circuit extends for each magnet, by wire 50, related contact blade 47, contact blade 45b, contact point 49 to the related magnet 10.

At the end of the machine operation a supplemental cam shaped member 341 (Fig. 4) also secured to cam disk 22 engages the vertical arm of a bell crank 52 rocking the same counterclockwise to elevate a link 53 thus rocking a bell crank 54 clockwise. A pair of such bell cranks is provided to carry a bar 55 (Fig. 3) and rock the same rearwardly to restore the released pawls 45 to normal so as to be subsequently relatched by levers 44, as is obvious from Fig. 3.

Total taking control

In the above described manner the items represented by successive records are entered in the counter and represented by the numeral wheels. But as it is desirable to zeroize the counter and take a total, mechanism is provided to accomplish this in a selective manner, and is preferably controlled by the cards themselves, that is, when a card which is unperforated arrives at the reading mechanism.

When such a card arrives, it will be observed that, in view of the absence of perforations, none of the magnets 10 is energized and, therefore, the racks 16 remain in their normal positions.

To provide for the selective control, a plurality of pins 58 (Fig. 3) are slidably arranged so that the left end of each abuts its related rack 16 and the right end engages the resilient spring blade of related contacts 57. A series of such contacts are in series relation with each other and a magnet 59 (Fig. 4), the circuit being extended by wire 57a to magnet 59.

Obviously, as the adjusting members 15 are immovable if perforations are not present in a card, the contacts 57 remain closed and the machine now passes an electrical impulse by wire 57a to the magnet 59.

Of course, if any card column has a perforation the related set of contacts 57 will open and, therefore, since magnet 59 is not energized due to the opening of its circuit, the machine will not be conditioned for a zeroizing operation.

Total taking mechanism (See Figs. 4, 12 and 13)

When magnet 59 is energized its armature 59a is depressed thereby rocking a plate 60 pivoted at 60' clockwise. The latter has a depending finger 60a abutting a pin 60b of a plate 61. The latter is suitably pivoted at 61' and has a pin and slot connection 62a to a slide 62. The latter has a pin and slot connection 64a to a pivoted hook 64 so that the latter is rocked into engagement with the lower end of the vertical arm of a bell crank lever 68. The extreme left end of plate 60 carries pivotally a hook 63 which engages an extension of a plate 66 slidably mounted by pins, the upper pin 66a receiving a slot of a pivoted hook 65. Thus, the latter is also rocked by the connection described so that hook 65 engages the lower end of a lever 67.

The engagement of hooks 64 and 65 with levers 68 and 67 respectively, is maintained by a spring urged pawl 90 engaging beneath a block 90a carried by plate 60. This preliminary setting of the machine occurs prior to the operation of the main operating shaft 1' and when such turns, cam disk 22 and other cams now to be mentioned are turned to effect the following functions.

As the upper teeth of racks 16 are normally in engagement with pinions 17 such disengagement is first effected by the following means.

A cam 72 secured to the main shaft 1' engaging a roller 71 carried by a slidable bar 73 shifts said bar to the left and as the bar has pivoted thereon the hook 64, the latter by its engagement with the vertical arm 68 rocks said arm clockwise so that its integral horizontal arm elevates a link 74. As the latter has a pin and slot connection to the lever 29 it is clear that such lever will now assume a horizontal position, which it will be recalled causes a disengagement of rack 16 and pinions 17 and such relationship is held until racks 16 are shifted idly to their rearmost positions.

In the next step of operation the racks 16 are shifted to their rearmost positions by the following means.

The roller 79 (Fig. 13) which is carried by a slidably mounted plate 81 is adapted to cooperate with a cam 80 so that the plate 81 and the hook 65 pivoted on plate 81 is initially shifted to the right. Therefore hook 65 causes the counterclockwise rocking of lever 67. The latter has a connection to a bar 82 which is slidably mounted in the machine frames and as shown in Fig. 3 is in operative cooperation with the right extremities of members 15. Thus the latter by bar 82 are shifted ten steps rearwardly after which the pinions 17 are engaged with the lower teeth of racks 16. This is effected as follows:

The horizontal arm of lever 68 has a link connection 75 to a lever 76 so that as lever 76 is rocked it closes contacts 83 to cause energization of a magnet 84. To this end link 75 carries a pin 75a working in an elongated slot of the right end of lever 76 so that in the extreme rocked position of lever 68, while the pinions 17 are out of engagement with the racks 16, contacts 83 will be closed by means of a pin 76a carried by the left end of lever 76 shifting the left blade of contacts 83.

As the lever 76 is rocked a latch pawl 77 will be rocked by its related spring 77b about its pivot 77a so that the lower end of the pawl 77 is shifted over the left extremity of lever 76, thus holding the lever 76 in rocked position.

Closure of contacts 83, as is obvious from the circuit connections shown in Fig. 4, will cause magnet 84 to be energized.

The armature 84a of magnet 84 has an integral horizontal arm which has a hook at its extremity adapted to normally receive the upper end of a bell crank lever 34. The lever 34 is urged by a spring 34a so that the shoulder of lever 34 normally coacts the pin 32, the normal relationship of pin 32 and lever 34 being shown in Fig. 11.

Recalling now that lever 29 is yet in a horizontal position with pinions 17 intermediate the upper and lower teeth of racks 16, it will be clear that the tension of spring 34a will cause pin 32 to be shifted to the left end of the slot 31', thereby placing the pin 32 at the left of the pivot 30.

As cam 72 continues to turn the roller 71 will leave the high cam edge, and therefore, be shifted to the right by a spring 73a so that shifting of bar 73 which carries roller 71 will permit lever 68 to be rocked counterclockwise by a spring 68a and as link 74 descends lever 29 will assume the inclined position shown in Fig. 4. Since pin 32 is at the left end of slot 31' this action will cause the elevation of lever 31 to bring, by shifting of bars 36, the lower or zeroizing rack teeth of racks 16 into mesh with the pinions 17, which racks, at this time, are in their extreme rearward (left) positions.

Thereafter, the turning of pinions 17 in the same direction as in addition measures the differential positioning of racks 17 that is by cooperation of the transfer projections 43 (Fig. 3) with a zero stop bar 78 (Fig. 3). The latter is placed in operative relationship with the transfer projections 43, prior to the return of racks 16 by the following means.

The pivot 77a of the stop bar 78 comprises the pivot of the pawl 77 so that when the latter is rocked by its spring 77b the stop bar will be positioned so as to be placed in the arcuate path of the transfer projection 43 to perform its function.

Recalling now that in item entering operations that at the initial operation of the machine, as the crescent shaped cam 27 leaves roller 37, plate 40 drops so that rod 41 (Fig. 3) permits pawls 42 to engage the adjusting members 15, it is stated that such operation is prevented in zeroizing operations so as to permit the free return of the racks 16 and adjusting members 15 without interference by the pawls 42. To this end the left extremity of plate 60 is connected by a link 69 to a pawl 70 which is of a bell crank formation. The upper end of pawl 70 engages under a projection 40b of plate 40 so as to prevent its lowering under control of the spring 40a and the crescent shaped cam 27, during the beginning of the machine operation, as described in connection with item entering operations.

In the next step of the operation of the machine roller 79 (Fig. 13) runs off one of the high portions of cam 80 so that hook 65 will now be shifted to the left and lever 67 will be restored from the rocked position to normal, thereby rod 82 is shifted to the right. Each adjusting member 15 and therefore related rack 16, is returned by its spring 125 an amount equivalent to the tens complement of the value previously represented on the related numeral wheel, determined by the coaction of the transfer projection 43 with the zero stop bar 78. At this time each figure wheel will be at "0" and will so indicate in the inspection windows 124 of the tabulating machine (see Fig. 1).

As the blocks 23 are now differentially set and each at a position from normal commensurate with the value previously on the related adding element they control the setting of the printing bars in precisely the manner explained in connection with item printing so that the type bars represent and control the printing of the actual total. In the event that a figure wheel stands at zero position the related block 23 will remain in its extreme rearward position thereupon causing the block 23 to engage with the lowest shoulder of the printing bar 18 which permits it to be raised to its highest position. This will present a special "0" type to the printing line to print a zero as an accompaniment to printing a total. This special "0" type is not shown in Fig. 3 but occupies a position immediately below the lowest printing type. As the same devices are involved in total printing as in item printing and the operation is the same generally, the description will not be repeated.

After the zeroizing and total printing operation the outside cam edge of cam 34l engages the left end of a plate 85 and this disengages hook 63. The connections between hook 63 and plate 85 to effect this operation consists of a notch 85a (Fig. 12) in plate 85 engaging a pin 63a of hook 63. As hook 63 is shifted to the right it is disengaged from plate 66 which thereupon drops so that the hook 65 is disengaged from lever 67.

It is pointed out that when lever 31 is shifted under control of lever 34 a hook 31b is caught by a hook 85, this coaction being maintained even when lever 29 is moved from a horizontal to an inclined position, while pin 32 is at the left end of slot 31'.

At the end of the machine operation the crescent shaped cam member 27 engages the roller 26 thereby rocking lever 25 and depressing the link 28 to cause the lever 29 to be shifted from the inclined or last position, with pin 32 at the left end of slot 31' and hook 31b engaged by hook 85, to the horizontal position. This operation causes lever 31 to be depressed, thus lowering bars 36 (Fig. 3) so that the lower teeth of racks 16 are disengaged from the pinions 17. As the racks 16 are now free of pinions 17 they are returned to normal under action of their return springs 125 leaving pinions 17 at zero.

When link 28 is depressed to cause lever 29 to assume its horizontal position, lever 31 is depressed so that hook 31b is disengaged from hook 85, since the latter is held up by a pin 87, stationary with respect to lever 31, as the pin is carried by the machine frame.

At this time roller 34c carried by the horizontal arm of lever 34 is engaged by cam 22 so that it is rocked clockwise, causing the upper end of the lever 34 to be relatched by the hook of armature 84a.

As the upper arm of lever 34 is shifted to the right spring 31a is effective to cause pin 32 to be shifted to the right end of slot 31' where it is again at the right of pivot 30. The crescent shaped cam 27 will subsequently leave the roller 26 so that lever 29 is now shifted from the last horizontal position to the inclined position shown in Fig. 4, thus lowering lever 31 and rods 36 so that the upper teeth of racks 16 engage the pinions 17, this being the normal position for item entering operations.

As cam 22 reaches its final position its cam plate 34I engages the upper end of a bell crank lever 88 rocking the same to shift a link 89 to the right. The right end of link 89 has a pivotal connection to the pawl 90 thus rocking the same and disengaging it from block 90a. The plates 60 and 62 are now restored by suitable springs or gravitational forces to their normal positions where they are ineffective for causing a total taking operation in a subsequent operation.

Also, as in item entering operations, link 53 is elevated so that a pin 53a carried thereby rocks the pawl 77 so as to unlatch it from the arm 76. This rocking of the pawl 77 rocks the total stop bar 78 to ineffective position, and arm 76 of course may, if desired, be shifted to normal by the resiliency of the left blade of contacts 76. As contacts 76 open magnet 84 is deenergized. The deenergization of magnet 84 is timed to occur before the relatching of lever 34 by armature 84a.

*Separate detachable counters*

As previously stated, provision is also made for entering values represented by perforated cards into separate counters which are detachable from the machine but which may have selective plug connections to the machine for simultaneous control.

Figure 2:
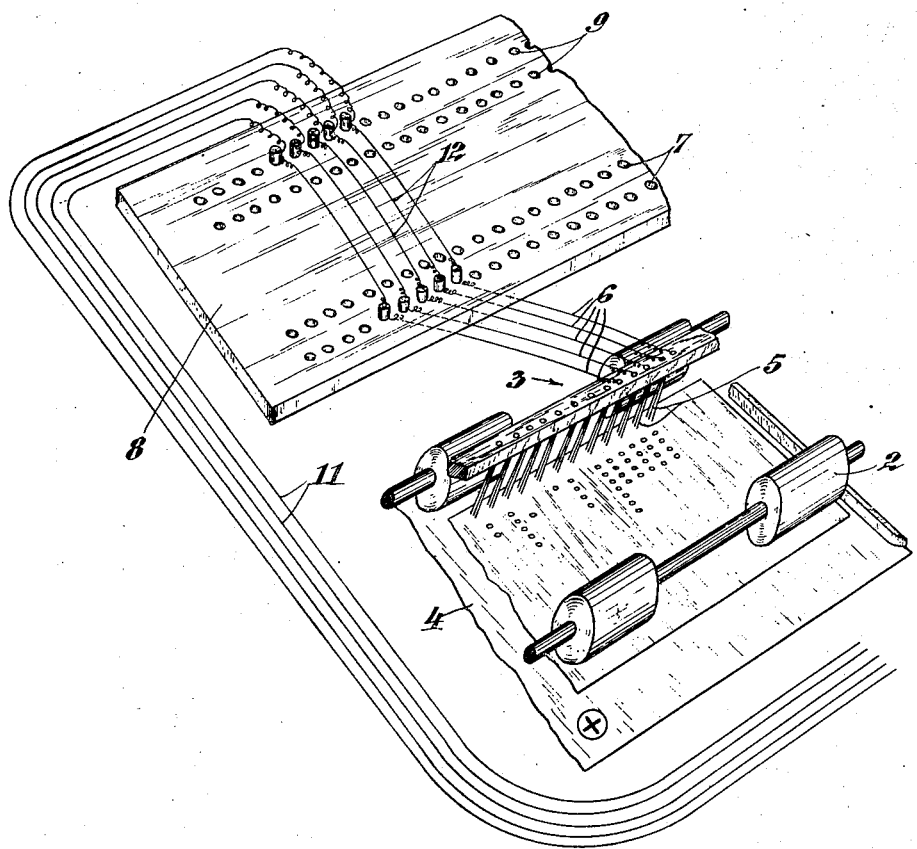
Fig. 2 is a diagrammatic view of the card-reading mechanism.

One mode of arranging the additional counters is shown in Fig. 1. Three additional counters B are arranged on a bracket A fixed to the lateral wall of a tabulating machine. While provision can be made for effecting selective connections from each of the counters B to the tabulating machine, such connections will be described in connection with only one of the counters, in view of the duplicate arrangement.

Each counter B has a series of six upper plug sockets 96 in which fit six plugs at one end of a cable 91a. Below the plug sockets 96 is a series of eight sockets 97 of the same counter, and in such sockets eight plugs are fitted which are at one end of a cable 91b. The six plugs at the other end of the cable 91a fit in sockets 7, which, it will be noted from an observation of Fig. 2 are connected to the reading brushes 5. The eight plugs at the other end of cable 91b fit in eight sockets 9, which it will be observed from Fig. 2, are connected by wires 11 to the counter magnets 10 of the tabulating machine.

A cable 91c is also provided and four plugs at one end fit in corresponding sockets 98, 99, 100 and 101 of the counter B. The four plugs at the other end and connected by wires in the cable 91c to the plugs for sockets 98, 99, 100 and 101 fit in sockets 95, 94, 93 and 92 respectively of the plugboard of the tabulating machine. The purpose of these and other connections will be given as the description progresses.

It will be assumed that the elements of the machine are split up so that a counter of eight orders in the tabulating machine is provided and the related elements of this counter and the elements of the counter B are plugged for control by six columns of a card field. It will also be assumed that the six card columns at the extreme left of the card control the entries. The two extra orders of the counter of the tabulating machine and separate counter are "overflow" orders, as is well known in the art.

Referring particularly to Figs. 1 and 8 which show the external plug connections and the wiring in the interior of a counter B it will be seen that electrical impulses from the reading brushes 5 are directed from the plug sockets 7 by cable 91a to the six sockets 96. From each one of such sockets there is one circuit through a related switch blade 102 to a related plug socket 97 and another from the switch blade 102 through a related switch blade 104 to the counter magnet 109 of the B counter. Therefore impulses are directed from the positive line side by brushes 5, cable 91a and cable 91b to the counter magnets 10 of the tabulating machine to the negative line side to effect such entries in the manner previously explained.

One side of the series of counter magnets 109 is connected to the socket 99 (Fig. 8) and by the wire in cable 91c a connection is made to socket 94 (Fig. 1) of the tabulating machine, which is connected to the negative line side, thus completing the circuit.

Thus counter magnets 109 are correspondingly energized by impulses and values are entered in the B counter in the following manner.

Each counter magnet 109 (Figs 6 and 7) is adapted to attract its related armature 110 one or more times, and at each time a pawl 111 pivoted on a lever 111a is first rocked by armature 110 to engage a related pinion 112, further movement of lever 111a and pawl 111 by armature 110 turning the pinion 112 a step. The arrangement is described generally herein as it is fully shown and described in the Tauschek Patent 1,781,349 dated November 11, 1930, to which reference may be had for more complete details.

Thus in the above described manner the numeral wheels 130 attached to pinions 112 are turned one or more steps simultaneously with the entry in the tabulating machine and receive additively the same entry.

*Provisions for independent transfers*

It will be obvious that if the counter of the tabulating machine and the counter B always have the same numerical reading, transfers in corresponding elements of the two counters can be simultaneously effected. But, if their numerical values at the start are different, transfers may be required at different times and, to prevent improper operations, it is intended in this arrangement that transfers be effected independently in each counter.

It will be recalled that the tens transfer for the tabulating machine is effected by closure of contacts 51 by means of the pin 51' on the cam 80 (see Figs. 4 and 9) thus effecting a connection from the positive line side (see Fig. 9) by contacts 51, contacts 51a now closed, and by wire 50 (see also Fig. 3) to cause as previously stated energization of the selected magnets 10.

At the same time, referring to Fig. 9, as contacts 51 close, a circuit is also extended to plug socket 92 of the tabulating machine and then extended by the wire 92a (Fig. 8) in cable 91c to the plug socket 101 of counter B which socket is connected to one side of a magnet 105, the other side of the magnet being connected to the negative line side by socket 99, as before described.

The magnet 105 is adapted to attract its related armature 105a to shift a vertical member which has a connection to each of the eight switch blades 104a—h to control the eight circuits between the magnets 109 and sockets 97. Therefore, as blades 104 are shifted from the position shown in Fig. 8 a disconnection is effected between each plug socket 97 and related counter magnet 109. Thus, sets of magnets 109 and 10 are disconnected so that any transfer impulses directed to magnets 10, cannot by the wires in cable 91b, sockets 97, and switch blades 104 be directed to magnets 109.

Figure 7:
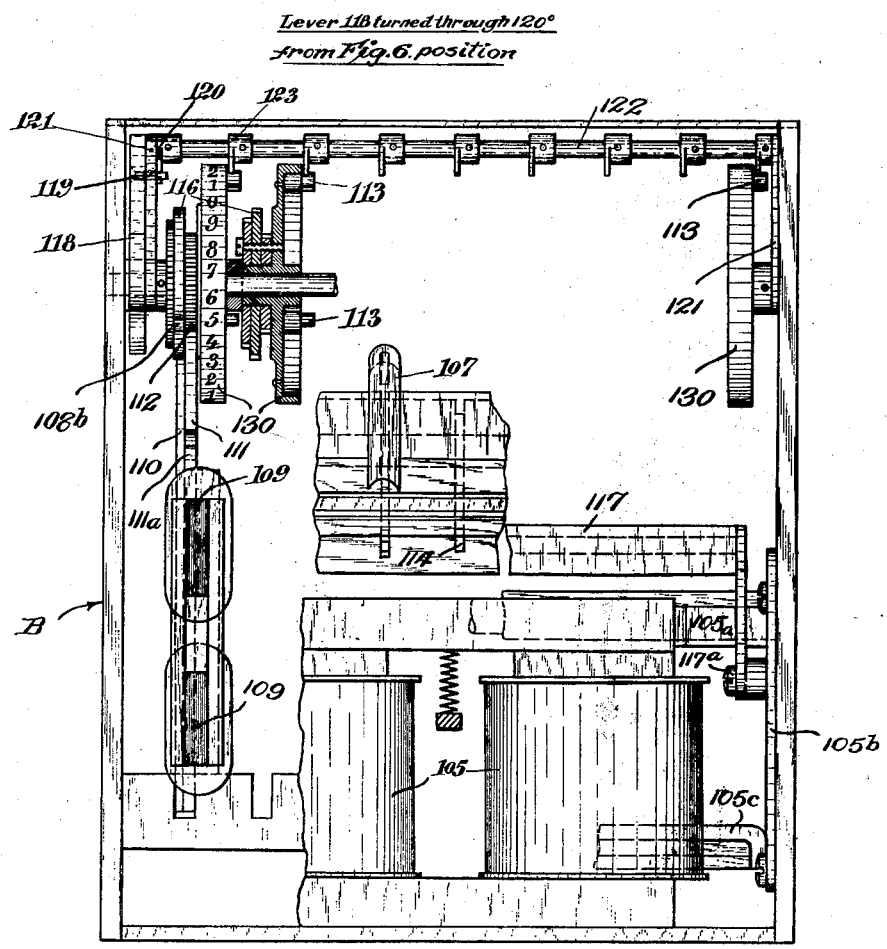
Fig. 7 is a rear elevation of the counter, a part of the casing having been removed.

The actual mechanical construction of switch 104 is shown in Figs. 6 and 7. The armature 105a of magnet 105 is connected at its ends to a pair of slides 105b to depress the slides and a bar 105c carried by the lower ends of the slides 105b. Depression of bar 105c will cause each blade 104 of a series to be shifted away from its upper related contact point or blade 104a to break the electrical connection therewith, and to make an electrical connection with the related lower point or blade 104b. It will be seen in Fig. 8 that each blade 104 normally contacts the upper contact point 104a but is shifted to contact the lower contact point 104b to correspond with Fig. 7.

Transfer mechanism for counter B

To provide for transfer operations in the counter B the following means is provided.

Each wheel 130 (Figs. 6 and 7) attached to the pinion 112 is provided with three transfer projections 113, since the wheel has three sets of numerals and one third of a revolution is necessary to cause the wheel pass from "9" to "0". During this fractional operation one of the transfer projections 113 in a clockwise rotation of the wheel strikes the diagonal edge of a transfer slide 114. The latter carries a cam plate 114a adapted to close contacts 107 whereupon such contacts remain closed until after the transfer operation.

Considering now Fig. 8 it will be seen that when switch blades 104 are shifted to contact points 104a that such shifting with the exception of the blade of the unit "a" or the units order, causes a connection from each counter magnet 109 to the contacts 107 controlled by the wheel 130 of the next lower order. Of course, as the unit "h" is the highest order transfer contacts 107 controlled by the related wheel are unnecessary.

Therefore, such contacts 107, as have been closed effect electrical connections to the selected magnets 109 by a circuit connection now to be described.

A bus bar 106 (Figs. 6 and 8) is connected to one blade of each of the sets of contacts 107 and by means of a switch i the bus bar 106 is connected to the socket 98. By means of a wire in the cable 91c socket 98 is connected to the socket 95 on the plugboard of the tabulating machine which is suitably connected to the positive line side.

Hence with the switch i closed, which is a normal condition in item entering, a circuit is effected from the positive line side to the bus bar 106 to the selected contacts 107 which are found closed, and thence by a related wire connection 107' to the related contact point 104b and thence by related switch blade 104 to the magnet 109 of the next higher order. It will be recalled that by the plug socket 99 a connection is made from each magnet 109 to the negative line side to cause energization of magnets 109.

Each magnet 109, when energized in a transfer operation causes a unit step of rotation of the related pinion 112 in precisely the manner explained to accomplish the necessary transfer.

Thus summarizing, energization of magnet 105 causes the disconnection of magnets 109 from the counter magnets 10 to permit independent transfers of each without improper operations. Also magnet 105 connects the transfer contacts 107 with the appropriate magnets 109 to cause the necessary transfer operations, dependent upon the previous closure of contacts 107. It will be obvious also that the transfer operations effected in the counter of the tabulating machine and the B counter are both controlled by the contacts 51 of the tabulating machine.

Resetting of counter B and total transfer

Digressing for a moment, it will be remembered that the counter of the tabulating machine is reset by the passage of a card unperforated in any card columns. As it is premised that six controlling card columns are provided to control the counter of the tabulating machine, it is evident that such columns should be unperforated and that only six of the switches 57 correlated to such card columns should be used to control zeroizing. Obviously, if all orders of the machine are used all switches 57 are employed, and only fewer switches 57 are used when a sub-division is made.

Figure 5:
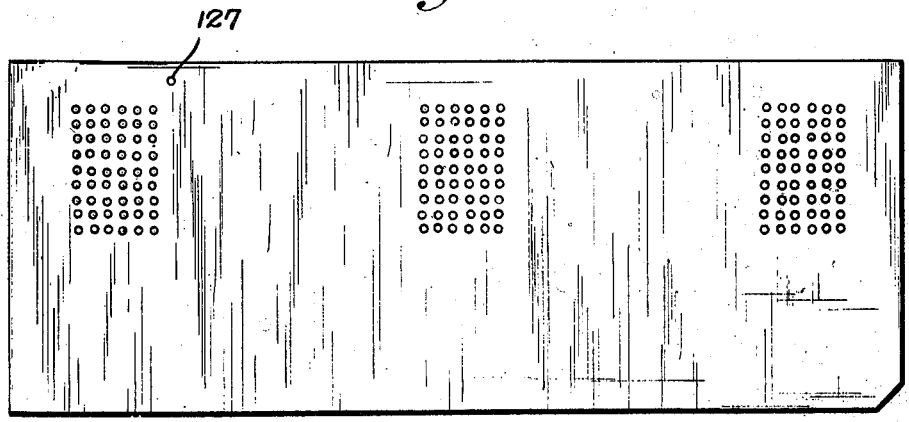
Fig. 5 is a plan view of the card employed to zeroize the additional counter.

Zeroizing in this manner obviously does not disturb the amount residing in the counter B and to reset the latter a special card shown in Fig. 5 is used and passed to the analyzer after an unperforated card has been used to control the zeroizing of the counter of the tabulating machine.

The six card columns which are correlated with the brushes 5 which control the entries in the main counter and counter B are each perforated with nine perforations. In the seventh column, and above the first perforations of the six columns is a special perforation 127. The socket 7 (Fig. 1) of the brush 5 of the seventh column has a plug connection to a socket 128 and this socket has a wire connection 128a (Fig. 4) to the magnet 84. Thus, if a card passes below brushes 5 the brush 5 of the seventh column closes a circuit from the positive line side to the magnet 84 to the negative line side and thus the machine is set to effect a total transfer from the B counter, as it is reset, to the counter of the tabulating machine. As magnet 84 is energized alone in this case the operation is slightly different than previously described and this difference will now be explained.

When magnet 84 is energized its armature 84a is attracted thus releasing lever 34 which is then urged counterclockwise under influence of its spring 34a as previously stated. As the shoulder at the upper part of lever 34 is in immediate engagement with pin 32 the latter is shifted to the left and due to the normal inclination of slot 31' the pin 32 rises, thus elevating lever 31, which has the effect of raising plate 36 and the bars 36. Noting Fig. 3, it will be obvious that this will cause racks 16 to be elevated thereby bringing the lower teeth thereof in immediate engagement with pinions 17. When racks 16 are subsequently moved rearwardly it will be clear that the pinions 17 will be turned rearwardly in a subtractive sense.

Now, recalling that the card shown in Fig. 5 is passed to the analyzing mechanism it will be seen that a series of nine electrical impulses are directed by the cable 91a to the six plug sockets 96 (Fig. 8). But due to the shifted position of blades 102 such impulses are directed to magnets 109 and magnets 10 through contacts 108 by circuits to be later traced.

First it will be explained how magnet 103 which causes the shifting of blades 102 receives its energization to cause shifting of the blades 102.

Referring to Fig. 1, by means of a plug cord, a plug connection is made between the socket 128 and a socket 126 which has a wire connection 126a (Fig. 9) to a magnet 115, which is connected to the negative line side by wire 126b to complete the circuit of the magnet 115. When the brush correlated with the column in which perforation 127 is located, senses such perforation, magnet 115 is energized. This results in the elevation of the armature 115a and the breaking of the contacts 51a.

As the armature 115a is elevated contacts 103a are closed. Thus a circuit will be extended from the socket 99 (Fig. 8), which it will be remembered is connected to the negative line side, to the magnet 103, thence to socket 100, wire 93a of cable 91c to the socket 93 (Fig. 9) and then to the upper contact of contacts 103a, the lower contact of which is connected to the positive side of the line.

The armature 115a of the magnet 115 is held attracted to hold contacts 103a closed until the rotation of the main operating shaft of the tabulating machine is terminated. This is preferably effected by means of a latch lever 131 which has a lower hook extension arranged to engage and hold armature 115a elevated.

When magnet 103 is energized it attracts its armature 103a downwardly thereby shifting the blades 102 and connecting the brushes 5 to counter magnets 109 and 10 through contacts 108. As shown in Fig. 6 for the actual construction when magnet 103 is energized its armature 103a is elevated against the action of a spring 103b. A plate 103c is thereby elevated and since it has a pin and slot connection 103d to bell crank frame members 103e it will rock said members 103e and roller 103f carried by members 103e. Roller 103f is of insulating material and is adapted to shift each of the blades 102. Normally the resiliency of a blade 102 makes contact with a related contact point 102a but when blade 102 is shifted it makes contact with contact 102b.

Considering now Fig. 8, with blades 102 rocked the circuit extends from a brush 5, and by way of a related socket 96 extends to blade 102, contact point 102b, related contacts 108, switch blade 104, magnet 109 to the negative line side by socket 99. Also from the right contact blade of a set of contacts 108 there is a wire connection to the related socket 97. Therefore as long as contacts 108 are closed, a series of electrical impulses, nine as a maximum number, is transmitted to both the counter magnets 109 and counter magnets 10.

It should also be noted that the brush 5 related to the extreme left card column terminating at socket marked 96b has a wire connection 96a to the set of three switch blades 102 of the three highest denominational units, f, g and h, which represent the overflow wheels of the separate counter and thus one card column controls total transfer in three orders.

Contacts 108 are also shown in Fig. 6 and are so arranged that the resiliency of the lower blade is sufficient to open the contacts when a circular tip 108a carried by the lower blade engages one of three notches 108b in a disk 116 attached to a related pinion 112 and which relationship of tip 108a and a notch 108b occurs when the reading wheel 130 exhibits "0". At other times the contacts 108 are closed.

For instance, if "6" is set on a wheel of the counter B its contacts 108 are closed as tip 108a is shifted by the circular periphery of disk 116 to close contacts 108. Therefore, referring to Fig. 8, electrical impulses are directed from the related analyzing brush 5 by the related blade 102 and contact point 102b to the related counter magnet 109 through contacts 108. As explained, in connection with item entering operations the magnet 109 will cause a step-by-step actuation of the related counter element 130 until four steps are performed, at which time the wheel will stand at zero, and as contacts 108 are now opened no further energization of magnet 109 and operation of wheel 130 will ensue. Also, the same number of electrical impulses is directed to the related counter magnet 10 of the tabulating machine and as the lower rack teeth now mesh with a related pinion 17 the latter is turned four steps in a subtractive sense from "0" (as it has been zeroized) to indicate "6".

In the same manner each element of the counter B is turned an amount corresponding to the tens complement of a digit if a digit other than "0" is represented. Also the elements of the main counter are turned the same amounts in a subtractive sense equivalent to the tens complement of the numerical value represented on the wheels of the counter B (if other than "0" is represented) to transfer the total from the counter B to the main counter. But as such elements are turned in a subtractive direction from "0", at the end of each operation they exhibit the numerical value previously standing on the counter B.

As the blocks 23 (Fig. 3) are now differentially set, they will control the setting of the printing mechanism to thereby print the complement of the amount standing on the counter B.

It is also pointed out that certain operations such as, the lowering of pawls 42 to hold racks 16 in shifted position, the operation of lever 25 by the crescent shaped cam member 27 to disengage racks 16 from the pinions 17 to permit restoration of racks 16 to normal, the shifting of bar 55 to restore the tripped transfer levers 45, and restoration of lever 34 to normal also occur during the total transfer and resetting operation, the operation being as previously described.

In view of the interruption of the transfer circuit 50 for the tabulating machine by opening of contacts 51a caused during the total transfer operation by magnet 115 no transfers will be effected in the tabulating machine as would be effected since each pinion 17 is subsequently turned reversely so as to pass from 0–9, in view of the fact that the reading wheels of the tabulating machine previously stood at zero.

Obviously, during the total transfer operation contacts 51 will also close and direct an impulse to socket 92 (Fig. 9) and by wire 92a (Fig. 8) to socket 101 (Fig. 8) and thus to magnet 105 to energize the same but even though the transfer members 114 (Fig. 6) are shifted as the wheels pass from 9–0, no transfers are effected in a total transfer operation in view of the opening of the circuit to the bus bar 106 (Fig. 6) by the switch blade f since magnet 103 is still energized.

At the end of the operation of the machine and after contacts 51 close a pin 132 (Fig. 9) on cam 80 will engage the upper end of bell crank lever 131 and rock the same to disengage the lower end from the armature 115a to separate contacts 103a and cause magnet 103 (Fig. 8) to be deenergized so that the tabulating machine and the separate counter are now ready for a normal tabulating operation.

Restoration of transfer members of counter B

In both total transfer operations and in item entering it is necessary to restore members 114 to normal and such is preferably effected under control of magnet 105, as the latter is energized and then deenergized in each total transfer operation and item entering operation. This function is effected by the following described mechanism.

Pivotally mounted upon the slides 105b (Figs. 6 and 7) by studs 117a is a frame which includes a cross bar 117 urged to the right by a light spring 117b. As magnet 105 is energized under control of contacts 51 at the end of the machine operation, certain of the members 114 may already be in shifted position (shown dotted in Fig. 6). Bar 117 therefore is depressed to the dotted line position shown without affecting the position of members 114 and with the edge 117c of bar 117 abutting the lower extremities of the shifted members 114. As magnet 105 is deenergized and the armature 105a of magnet 105 is restored by suitable spring means, bar 117 will be elevated vertically, and its inclined edge 117c acting as a cam edge will thereby shift the members 114 to the right to normal position.

Manual reset of "B" counter

Each additional counter is provided with mechanism under control of a lever 118 which is externally operated and turned approximately 120° to turn the wheels 130 of the counter B to zero.

The lever 118 (Figs. 6 and 7) is pivoted upon the shaft which supports the counter wheels 130 and is of bell crank formation, one lever extending through a slot in the casing of the counter and the other lever carries a pin 119. Also mounted on the same pivot of lever 118 is a pair of arms 121 which carry a shaft 122 and the left end of the shaft 122 is provided with a small lever 120 which has an open slot receiving the pin 119. Therefore, upon an initial clockwise turning of lever 118 pin 119 will turn arm 121 counterclockwise to turn the shaft 122 in the same direction.

The shaft 122 carries a plurality of hooks 123 each in the plane of the three transfer projections 113 of the related wheel 130 but normally turned so as not to interfere with any of such projections during item entering operations. As shaft 122 is turned counterclockwise by lever 118 the hooks 123 are turned a limited amount to come in the path of projections 113 so that further turning of lever 118 about its pivot will cause shaft 122 to turn about its pivotal point, i. e., the shaft of the numeral wheels, and hooks 123 will engage the projections 113 in their variously displaced positions and turn the wheels 130 to zero. The lever 118 is thereafter restored to normal.

From the above description it will be readily seen that the B counter may be reset independently of the counter of the tabulating machine, so that while amounts may be erased from the B counter they can remain in the main counter, and also amounts can be erased from the main counter and remain in the B counter.

It is obvious of course that if the amount which is transferred to the main counter as a result of a total transfer operation is to be erased that such can be effected by passing a blank card to the machine.

What is claimed is as follows:—

1. The combination with a tabulating machine including at least one counter, of a supplemental counter, means for electrically connecting at will the counter of the tabulating machine with the supplemental counter to receive entries simultaneously under record control, and means under record card control for zeroizing the supplemental counter to transfer the total thereon to the fixed counter of the tabulating machine.

2. The combination with a counter of a tabulating machine, of a supplemental counter, means under control of a record for effecting successive electrical impulses to zeroize the elements of the supplemental counter, and means for interconnecting both counters to transfer a total from the supplemental counter to the counter of the tabulating machine.

3. In an apparatus of the class described, a counter having a transfer mechanism, a separate counter having its own transfer mechanism, record controlled means for effecting the same entries simultaneously in both counters, a multi-blade switch, one blade for each element of the counters for controlling the interconnection of both counters, and means for shifting said blades to disconnect the counters from each other when the transfer mechanisms are to operate.

4. In combination, analyzing means of a tabulating machine, a counter separable from the tabulating machine and having adding elements, means for effecting item entries in said counter under control of said analyzing means, a counter of the tabulating machine simultaneously receiving entries under control of said entry effecting means, and means whereby entries under control of the same analyzing means are effected in the separable counter for resetting the latter.

5. The combination expressed in claim 4 and including further, means whereby each adding element of the separable counter determines the extent of its own operation when entries are effected in said separable counter for resetting the latter.

6. The invention according to claim 4 and including further, and means whereby the separable counter determines the extent of actuation of the counter of the tabulating machine when entries are effected in the separable counter for resetting the latter.

7. In an apparatus of the class described, a plurality of counters, means for effecting the same entries in said counters simultaneously, transfer mechanisms for each counter, means whereby each transfer mechanism operates independent of the other in an entry operation, and means for effecting the zeroizing of a total on one counter and transferring the total to the other counter and coincidentally preventing the operation of the transfer mechanism of either counter.

8. In an accounting machine, a plurality of counters, transfer mechanisms for each counter, means for transferring an amount from one counter to the other, and means for coincidentally preventing the operation of either transfer mechanism.

9. In an accounting machine, a plurality of counters, means for effecting entries simultaneously in both counters, means controlled by adding elements of one counter to determine the extent of their actuation to zeroize said elements, means for causing the actuation of one counter in accordance with the other counter zeroized, a transfer mechanism for each counter, and means effective upon a zeroizing operation to prevent operation of either transfer mechanism.

10. In a tabulating machine, a plurality of counters, printing mechanism, record controlled means for effecting the same entries simultaneously in both counters, record controlled means for zeroizing one counter and operative for causing the transfer of its total to the other counter, and means whereby the counter receiving the total controls the setting of the printing mechanism.

11. In an accounting machine, an adding element, electrical means for operating said element, means including a zeroizing perforated card whereby a predetermined number of electrical impulses may be directed to said electrical means, and means controlled by the adding element to determine the number of impulses that are directed to said electrical means.

12. In a tabulating machine, a series of adding elements, a zeroizing card having designations in a plurality of columns for representing the same value in each column, and means under control of the designations of said card to cause the zeroizing of the adding elements.

13. In a tabulating machine, a series of adding elements, a zeroizing card having designations in a plurality of card columns, the adding elements being greater in number than the card columns, and means whereby the designations in said card columns control the zeroizing of the related adding elements with provision of means whereby one of the card columns controls the zeroizing of the adding element in excess of the card columns.

14. In a tabulating machine, accumulator pinions, differentially movable members, a set of adding racks and a set of subtracting racks shiftably mounted on said members, a magnet for controlling the shifting of the adding and subtracting racks to select one of the sets of racks for operations, and record controlled means for causing said magnet to be energized.

15. In a tabulating machine, the combination with two counters each with its own transfer mechanism, means for causing the counters to be interconnected to receive the same entries, record controlled means for effecting the same entries in both counters, and means for disconnecting the counters from each other when the transfer mechanisms are to operate so that one transfer mechanism may operate independent of the other transfer mechanism.

16. In a tabulating machine, the combination with a counter having its transfer mechanism, of a supplemental counter having its own transfer mechanism, separate sets of controlling magnets for each counter, means for electrically interconnecting said sets of magnets for concurrent energization under record control to effect the same entries in both counters, and a switch for opening the interconnection of the sets of magnets so that the transfer mechanisms of one counter requiring the energization of its related set of magnets may operate independently of the other transfer mechanism.

17. In a record controlled tabulating machine, a plurality of counters, means for connecting both counters to receive the same entries simultaneously under record control, and means under record control for zeroizing one counter to transfer the total thereon to the other counter.

18. In a record controlled tabulating machine, a plurality of counters, means for connecting both counters to receive the same entries simultaneously under record control, means under record control for first zeroizing one of said counters, and means under record control for then zeroizing the other counter for transferring the total thereon to the counter first zeroized.

19. In an accounting machine, a plurality of counters, means for interconnecting said counters for effecting additive entries in both counters, means for causing an additive entry to be made in one counter for zeroizing the latter, and means for disabling the interconnecting means and for causing the other counter to be actuated under control of the counter being zeroized to enter the true numerical amount which is on the zeroized counter to the other counter.

20. In an accounting machine a plurality of counters, separate actuating means therefor, record controlled means for causing an additive entry in one counter by its related actuating means for resetting said counter, and means under control of said record controlled means for causing the actuating means of the other counter to actuate the latter in accordance with the counter being zeroized.

21. In a tabulating machine, a plurality of counters having related sets of adding elements, transfer mechanism for each counter, means for simultaneously zeroizing one set of elements, means effective when the adding elements of the counter to be zeroized stand at other than zero for causing the initiation of the operation of the other set of adding elements concurrently therewith and for determining the extent of operation of each of the latter and means for preventing the operation of both transfer mechanisms when the last named means is in operation.

22. In a tabulating machine, adding elements including transfer mechanism, a zeroizing card having the same value representing designations in a plurality of columns, means under control of the card designations to cause the zeroizing of the adding elements, and means to render the transfer mechanism inoperative during the zeroizing of said adding elements.

23. In a tabulating machine, a series of adding elements, a zeroizing card having the same value representing designations in a plurality of columns, and means under control of the card designations and said adding elements to cause the zeroizing of the latter.

24. In a tabulating machine, in combination, a plurality of counters, and means under control of a zeroizing card having similar values represented in all card columns for causing one counter to be zeroized and by the zeroizing operation its total transferred to the other counter.

25. In a tabulating machine, in combination, a plurality of counters each having its own transfer mechanism, means under control of a zeroizing card for causing one counter to be zeroized and its total transferred to the other counter, and means for causing each of said transfer mechanisms to be inoperative during the total transfer operation.

26. In a tabulating machine, a plurality of counters, and means including a zeroizing card for zeroizing one counter by its operation in an additive direction and for coincidentally causing the operation of the other counter in a reverse direction for a total transfer operation.

27. In a tabulating machine, in combination, a series of adding elements, a series of zeroizing electrical circuits less in number than the number of adding elements of the series with provision of means whereby one circuit of the series is related to an excess adding element, and means including a zeroizing card having zeroizing designations in columns commensurate in number with the series of electrical circuits for causing the electrical circuits under control of the adding elements to be effective to cause the zeroizing of the adding elements.

28. In an accounting machine, a numerical representing element, electrical means for setting up a numerical representation on said element, means whereby a predetermined number of electrical impulses may be directed to said electrical means, means controlled by said element to determine the number of impulses that are directed to said electrical means, an adding element, related operating means, and means whereby the first named element also determines the number of impulses that may be directed to the last named electrical operating means of the adding element.

GUSTAV TAUSCHEK.